(12) United States Patent
Steele et al.

(10) Patent No.: US 7,000,199 B2
(45) Date of Patent: Feb. 14, 2006

(54) METHODOLOGY FOR VIEWING LARGE STRATEGIES VIA A COMPUTER WORKSTATION

(75) Inventors: Michael S. Steele, Berkeley, CA (US); Stuart L. Crawford, Piedmont, CA (US)

(73) Assignee: FairIsaac and Company Inc., San Rafael, CA (US)

(*) Notice: Subject to any disclaimer, the term of this patent is extended or adjusted under 35 U.S.C. 154(b) by 485 days.

(21) Appl. No.: 09/852,776

(22) Filed: May 9, 2001

(65) Prior Publication Data

US 2002/0167551 A1 Nov. 14, 2002

(51) Int. Cl.
G09G 5/00 (2006.01)

(52) U.S. Cl. .................. 715/854; 715/514; 715/517; 715/526; 715/861

(58) Field of Classification Search ........ 715/514–526, 715/853–855, 500, 508, 825, 826, 861, 501.1; 345/762–767, 775–778, 815–816, 853–855, 345/866
See application file for complete search history.

(56) References Cited

U.S. PATENT DOCUMENTS

| | | | |
|---|---|---|---|
| 5,528,735 A | 6/1996 | Strasnick et al. | 395/127 |
| 5,537,630 A | 7/1996 | Berry et al. | 395/155 |
| 5,546,529 A | 8/1996 | Bowers et al. | 395/159 |
| 5,603,025 A | 2/1997 | Tabb et al. | 395/602 |
| 5,608,898 A | 3/1997 | Turpin et al. | 395/619 |
| 5,623,541 A | 4/1997 | Boyle et al. | 379/136 |
| 5,644,686 A | 7/1997 | Hekmatpour | 395/50 |
| 5,682,487 A | 10/1997 | Thomson | 395/342 |
| 5,692,107 A | 11/1997 | Simoudis et al. | 395/50 |
| 5,696,885 A | 12/1997 | Hekmatpour | 395/54 |
| 5,701,137 A | 12/1997 | Kiernan et al. | 345/119 |
| 5,701,400 A | 12/1997 | Amado | 395/76 |
| 5,710,896 A | 1/1998 | Seidl | 395/333 |
| 5,720,007 A | 2/1998 | Hekmatpour | 395/54 |
| 5,742,836 A | 4/1998 | Turpin et al. | 395/768 |
| 5,745,712 A | 4/1998 | Turpin et al. | 395/333 |
| 5,787,416 A | 7/1998 | Tabb et al. | 707/2 |
| 5,796,932 A | 8/1998 | Fox et al. | 395/161 |
| 5,806,056 A | 9/1998 | Hekmatpour | 706/50 |

(Continued)

FOREIGN PATENT DOCUMENTS

EP 0690367 1/1996 ............ 3/33

(Continued)

OTHER PUBLICATIONS

Hightower, et al. "Graphical Multiscale Web Histories: A Study of PadPrint," CM HYPERTEXT '98 Conference, Pittsburgh, Jun. 20-24, 1998.*

(Continued)

*Primary Examiner*—Tadesse Hailu
(74) *Attorney, Agent, or Firm*—Michael A. Glenn; Glenn Patent Group

(57) ABSTRACT

The invention herein draws from the design principles of the field of information visualization and provides a series of design principles for the efficient display of large strategies, based in part upon the use of fish-eye views. Specific principles include any of the following: do not let the off screen part of strategy affect the display of the on screen part of the strategy; do not try to show detail where it is not important; always show the condition path; no scroll bars; provide navigational shortcuts; provide navigational cues; fit as much information on the screen as possible; maintain a consistent top of the strategy-children orientation; fit the strategy display into a rectangular view; and be capable of rendering all strategies.

15 Claims, 2 Drawing Sheets

U.S. PATENT DOCUMENTS

| | | | |
|---|---|---|---|
| 5,806,256 A | 9/1998 | Byrne | 706/50 |
| 5,815,155 A * | 9/1998 | Wolfston, Jr. | 715/855 |
| 5,815,415 A | 9/1998 | Bentley et al. | 364/578 |
| 5,822,745 A | 10/1998 | Hekmatpour | 706/59 |
| 5,870,559 A | 2/1999 | Leshem et al. | 395/200.54 |
| 5,870,768 A | 2/1999 | Hekmatpour | 707/501 |
| 5,890,131 A | 3/1999 | Ebert et al. | 705/7 |
| 5,917,492 A | 6/1999 | Bereiter et al. | 345/357 |
| 5,920,873 A | 7/1999 | Van Huben et al. | 707/202 |
| 5,930,764 A | 7/1999 | Melchione et al. | 705/10 |
| 5,953,017 A | 9/1999 | Beach et al. | 345/440 |
| 5,953,707 A | 9/1999 | Huang et al. | 705/10 |
| 5,958,008 A | 9/1999 | Pogrebisky et al. | 709/223 |
| 5,966,126 A | 10/1999 | Szabo | 345/348 |
| 5,966,695 A | 10/1999 | Melchione et al. | 705/10 |
| 5,974,127 A | 10/1999 | Wernli et al. | 379/201 |
| 5,982,370 A | 11/1999 | Kamper | 345/356 |
| 5,987,242 A | 11/1999 | Bentley et al. | 395/500.34 |
| 5,999,192 A | 12/1999 | Selfridge et al. | 345/440 |
| 6,014,138 A | 1/2000 | Cain et al. | 345/335 |
| 6,073,138 A | 6/2000 | de l'Etraz et al. | 707/104 |
| 6,078,324 A | 6/2000 | Phathayakorn et al. | 345/348 |
| 6,088,693 A | 7/2000 | Van Huben et al. | 707/8 |
| 6,089,453 A | 7/2000 | Kayser et al. | 235/383 |
| 6,094,654 A | 7/2000 | Van Huben et al. | 707/8 |
| 6,108,004 A | 8/2000 | Medl | 345/346 |
| 6,111,578 A | 8/2000 | Tesler | 345/356 |
| 6,112,202 A | 8/2000 | Kleinberg | 707/5 |
| 6,134,706 A | 10/2000 | Carey et al. | 717/1 |
| 6,137,499 A | 10/2000 | Tesler | 345/440 |
| 6,285,366 B1 * | 9/2001 | Ng et al. | 715/853 |
| 6,396,488 B1 * | 5/2002 | Simmons et al. | 715/812 |
| 6,646,652 B1 * | 11/2003 | Card et al. | 345/645 |

FOREIGN PATENT DOCUMENTS

| | | | |
|---|---|---|---|
| EP | 0717346 | 6/1996 | 3/33 |
| EP | 0770967 | 5/1997 | 17/60 |
| EP | 0978989 | 2/2000 | |
| WO | 93/20510 | 10/1993 | 9/44 |
| WO | 95/12161 | 5/1995 | 9/44 |
| WO | 97/21171 | 6/1997 | 9/44 |

OTHER PUBLICATIONS

Bederson et al. "A Zooming Web Browser," 9th Annual ACM Symposium on User-Interface Software and Technology, 1997.*

Emanuel G. Noik, Layout-independent Fisheye Views of Nested Graphs, 1993.*

Stuart Pook et al., "Context and Interaction in Zoomable User Interfaces," (ACM Press), pp 227-231 & 317, May 2000, Palermo, Italy.*

Manojit Sarkar and Marc H. Brown, "Graphical Fisheye Views of Graphs," ACM 1992.*

Benjamin B. Bederson and James D. Hollan, "Pad++: A Zoomable Graphical Interface for Exploring Alternate Interface Physics," ACM, 1994.*

Fekete, et all., "Excentric Labling: Dynamic Neighborhood Labeling for Data Visualization," ACM, 1999.*

J. Clark; *Customizing Common Controls*; Sep. 1997; Dr. Dobb's Journal.

Peter Coffee; *SPSS More than a Pretty Face*; Feb. 1996; PC Week.

George W. Furnas: *Generalized Fisheye Views*; 1986; Human Factors in Computing Systems CHI '86 Conference Proceedings.

John Lamping, Ramona Rao, and Peter Pirolli; *A Focus+Context Technique Based on Hyperbolic Geometry for Visualizing Hierarchies*; Xerox Palo Alto Research Center.

* cited by examiner

METHODOLOGY FOR VIEWING LARGE STRATEGIES VIA A COMPUTER WORKSTATION

BACKGROUND OF THE INVENTION

1. Technical Field

The invention relates to the organization and viewing of information. More particularly, the invention relates to a methodology for viewing large strategies via a computer workstation.

A strategy is a series of decisions that divide a population into subsets. The first decision divides the population into two or more segments (i.e. partitions). For each of these segments, a second decision divides the segment into smaller segments. The second decision depends on the choice for the first decision, and the third decision depends on the choice for the second decision, and so on. So strategies can be represented as trees, where each branch of the tree represents the decisions to make given the choices for earlier decisions. The "root" of the strategy is the first decision.

2. Description of the Prior Art

Displaying large strategies on a computer display using current methodologies is problematic because the structure of the entire strategy adversely affects the portion of the strategy one wishes to view. Navigation using existing methodologies is problematic because location context of a segment of the strategy, i.e. the decision sequence corresponding to that segment within the strategy, is not provided, and because navigation takes places by moving around the canvas on which the strategy is displayed, rather than more naturally navigating from segment to segment.

What's Wrong with the Current Tools?

The current crop of strategy display tools have a variety of problems, as follows:

Some tools cannot display all strategies.

Many of the existing tools cannot display certain kinds of strategies. For example, commercially available strategy viewers can only display strategies that have a single segmentation variable on each level of the strategy.

They do a very poor job of displaying large strategies.

Historically, strategies have been small. This is certainly true, in large part, because the strategies were constructed manually. One could also argue that the strategies were kept artificially small due to the fact that large strategies are so difficult to view and interact with using the existing set of tools. In some tools of this type, strategies are automatically constructed and tend to be large and sometimes very large. Even though the strategies are automatically constructed, it is still critical to be able to view and edit them. Even the most sophisticated of the current crop of tools does a mediocre job of displaying such large strategies.

All these tools employ the same layout technique, i.e. they provide enough distance between each pair of segments on the same level of the strategy to fit all of their descendant segments in between them. When displaying a large strategy, the segments closest to the top of the strategy often become very separated, sometimes so distant that is impossible to see more than one of these segments on the computer screen at the same time. This makes it difficult to edit and understand the conditions at the very top of the strategy, which are the most important conditions in the strategy.

Navigation through the strategy is inefficient.

Navigation techniques in traditional tools, such as scrolling and zooming the canvas upon which the strategy is displayed, are poor approaches to strategy navigation. When the canvas is too large to be displayed on the computer screen in its entirety with an adequate amount of detail, it is all too easy to lose one's place within the strategy and to lose locational context. These tools require the user to know the place on the canvas to which they want navigate. When the strategy becomes even moderately sized, it becomes difficult to remember where on the canvas a certain branch is located. It can require much trial and error before the desired branch is found. Simple navigational goals, such as "Go to the segment containing the segment I am currently looking at" or "View all the descendant segments of the segment I am currently looking at" are difficult to achieve quickly with the traditional tools.

The condition path is difficult to follow.

The sequence of conditions that must be met in order to reach any segment in the strategy is the condition path. The condition path is a critical element of a segment of the strategy because it answers the questions "How do I get here?" and "What does this segment of the strategy mean?" Despite this critical need, none of the current tools provides a way to view the condition path easily.

No prior approaches exist to solve these problems. It would therefore be advantageous to provide a methodology for viewing large strategies, for example via a computer workstation.

SUMMARY OF THE INVENTION

The invention herein draws from the design principles of the field of information visualization and provides a series of design principles for the efficient display of large strategies, based in part upon the use of fish-eye views. Specific principles include the following:

Make it very quick and easy to select which portion of the strategy is displayed on screen.

Do not let the off screen part of strategy affect the display of the on screen part of the strategy.

Fit as much information on the computer screen as possible, but suppress any information that only causes clutter in the display.

Always show the condition path.

Rather than navigating by scrolling and zooming a canvas upon which the entire strategy is displayed, navigate by hopping from segment to segment.

Provide navigational shortcuts, making it quick and easy to navigate from a segment to a neighboring segment, such as a sibling or descendant segment.

Provide navigational cues when hopping from one segment to another.

Maintain a consistent top of the strategy-to-leaves orientation.

Fit the strategy display into a rectangular view.

Be capable of rendering all strategies.

DETAILED DESCRIPTION OF THE INVENTION

Figure 1:
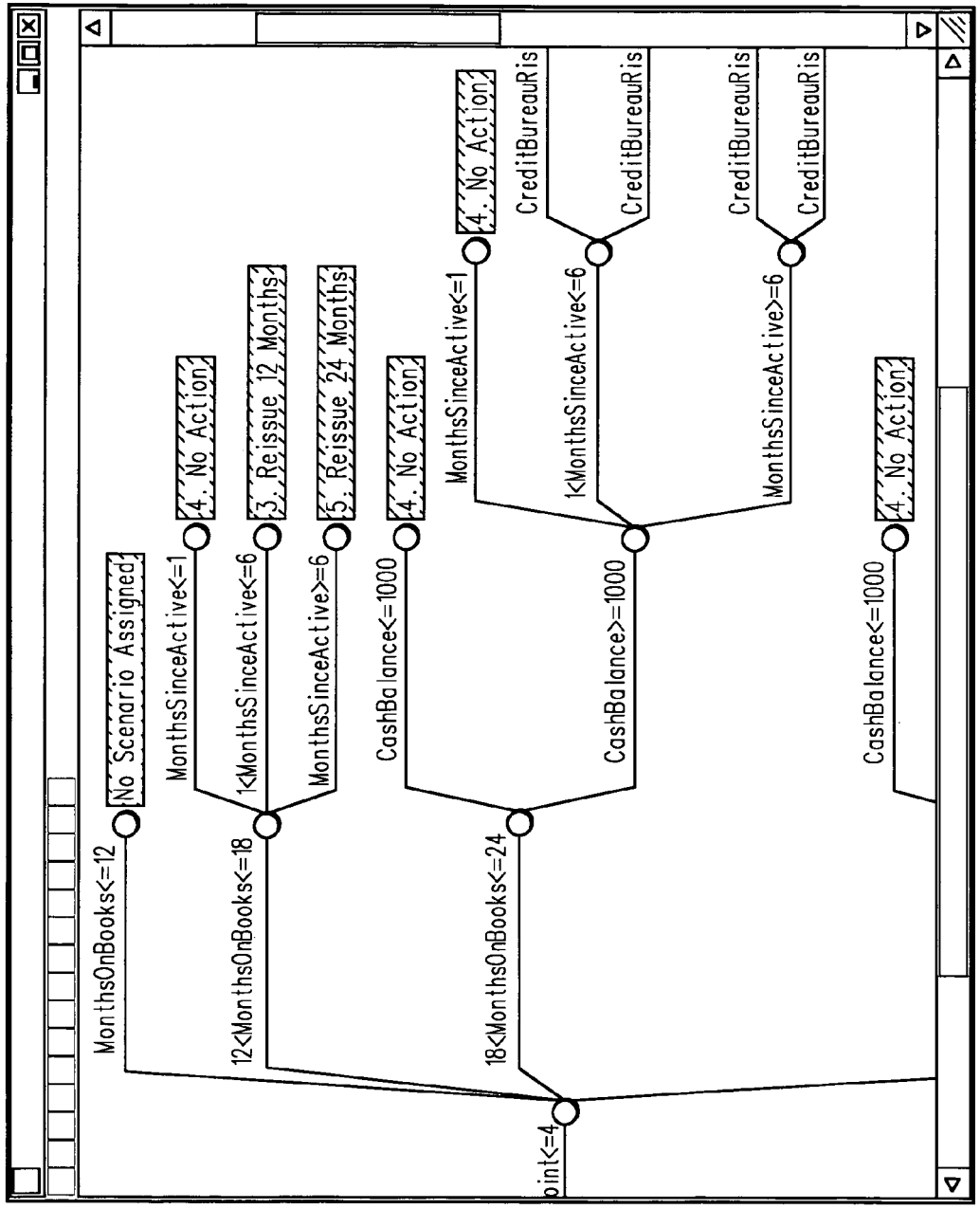
FIG. 1 is a display of a conventional strategy view.

The invention herein draws from the design principles of the field of information visualization, advocated by E. Tufte, *The Visual Display of Quantitative Information*, Graphics Press (February 1992), and specifically makes use of display techniques such as fish-eye views (see, for example, G. Furnas, *Generalized Fisheye Views*, Human Factors in Computing Systems CHI '86 Conference Proceedings, 16–23 (1986).

Design Principle 1: Make it Very Quick and Easy to Select which Portion of the Strategy is Displayed on Screen.

In traditional approaches to displaying a strategy, the whole strategy is rendered on a canvas. A portion of the strategy is selected for display by moving about a rectangular viewing area over the canvas with scroll bars. The portion of the strategy underneath the viewing area is displayed on screen. With this approach, it is common for bits and pieces of multiple strategy branches to appear on screen at once with none of these branches shown in their entirety. Often, individual segments are clipped by the edge of the viewing area so that they are not shown displayed in their entirety. These aspects of the traditional approach make it difficult to choose a portion of the strategy for display.

With the invention herein, the user selects which portion of the strategy to display by choosing a branch to display and how many levels of that branch to display. A branch is chosen for display simply by clicking the segment at the top of that branch so that this segment becomes the focus segment. Most of the display is devoted to showing just the descendant segments of the focus segment. Segments are never clipped by the display edges. They are either displayed in their entirety or are completely hidden.

When the branch to be displayed is quite large itself, the user can limit the number of levels of the branch being displayed so that he or she can concentrate on the segments near the top of the branch. Those segments beyond the limit are not rendered. The user can specify the limit very quickly, which makes this a fast method for hiding those segments lower on the branch that are not currently of interest.

Design Principle 2: Do Not Let the Off Screen Part of a Strategy Affect the Display of the on Screen Part of the Strategy.

The traditional approach to displaying a large strategy is fundamentally flawed because the entire strategy is first laid out in memory, even though only part of that strategy is viewable at any time. This leads to a phenomenon where the most important part of the strategy, i.e. the initial branches nearest to the top of the strategy, cannot be viewed in their entirety with sufficient detail because the off screen portion of the strategy is so bushy. The best one can hope to do is get a sense of those initial branches by scrolling and zooming—a very cumbersome approach.

The approach taken by the invention herein is very different. If a portion of the strategy is not being viewed, it has no effect on the layout of the visible portion of the strategy. This means that the strategy layout is dynamic and adaptable to the current portion of the strategy being viewed. It is not static as is the case of the current set of tools. So not only can the user select a portion of the strategy to view at a time, but that portion is rendered in the best way possible for that portion, disregarding the rest of the strategy which is not being displayed. In particular, this means that the segments closest to the top of the branch being displayed can be displayed with sufficient detail and reasonably close to each other.

Design Principle 3: Fit as Much Information on the Computer Screen as Possible but Suppress any Information that Only Causes Clutter in the Display.

When displaying strategies, this design principle can be restated as "Show more information for segments nearer the top of the strategy of the strategy than for segments far from the top of the strategy of the strategy."

The traditional approach to strategy display shows every segment in the strategy with the same amount of detail. If one zooms in, every segment gets bigger and if one zooms out every segment gets smaller. Contrast this with the fish-eye approach (see Furnas, supra.) that defines a single segment as the focal point of the display and displays segments with less detail the farther away they are from the focal point. This makes for a very efficient use of screen real estate and dispenses with the need to provide a traditional zoom capability.

The focus segment is closer to the top of the strategy of the strategy than its descendant segments are. Much information can be displayed about the focus segment because there is always only one focus node being displayed at any time. Much less information can be displayed about each of the descendant segments of the focus segment especially those several levels away from the focus segment, because there may be dozens, hundreds, or even thousands of those. Trying to display the same amount of information for each of these segments only makes the display so cluttered to become unusable. Information about each of these segments is suppressed when its display leads to too much clutter.

The invention herein treats the focus node specially. Its sibling segments are displayed without any of their descendant segments. The invention herein also uses a sophisticated scheme to determine when information about descendant segments is suppressed from the display based on how closely the descendant segments are rendered. When there are many descendant segments in a level, the labels for each segment's thresholds are suppressed, but the segment's split variable continues to be displayed. Where there are even more descendant segments in a level, the label for the segment's split variable is also suppressed. With additional descendant segments, the shape representing the segment in the display is drawn more compactly to permit more segments being rendered side-by-side.

Design Principle 4: Always Show the Condition Path.

As described above the condition path, i.e. the path of segments from the top of the strategy to the focus segment, is a critical piece of information to the viewer of a strategy in identifying which branch of the strategy is currently displayed and where the branch is located within the strategy. The technique herein disclosed always displays the set of conditions needed to reach the single segment currently selected as the focus segment.

Design Principle 5: Rather than Navigating by Scrolling and Zooming a Canvas Upon which the Entire Strategy is Displayed Navigate by Hopping from Segment to Segment.

Scroll bars are fine for scrolling around an image, where the width of an atomic piece of information is a pixel. In the context of a strategy, the atomic piece of information is a segment, and providing scrollbars that allow one to scroll a pixel at a time is inefficient. Instead of scroll bars, navigation herein is accomplished by hopping from segment to segment. A hop is from the focus segment to any of its relatives, making that relative the new focus segment. Relative segments are sibling segments, descendant segments, or ancestor segments in the condition path.

Design Principle 6: Provide Navigational Shortcuts Making it Quick and Easy to Navigate from a Segment to a Neighboring Segment Such as a Sibling or Descendant Segment.

In the traditional tools, the only way to navigate to a particular point in the strategy is via scrolling. In the herein disclosed technique, navigation occurs by hopping from the focus segment to another segment, making that other segment to the new focus segment.

Thus:
  Clicking any segment in the display makes that segment the focus segment.
  Clicking a condition in the condition path makes the segment corresponding to that condition the focus segment.
  Clicking a previous segment button makes the focus segment's previous sibling the new focus segment. If there is no previous sibling, the previous segment in the same level of the strategy becomes the new focus segment.
  Clicking a next segment button makes the focus segment's next sibling the new focus segment. If there is no next sibling, the next segment in the same level of the strategy becomes the new focus segment.
  Clicking an up level button makes the segment containing the focus segment become the new focus segment.

Design Principle 7: Provide Navigational Cues when Hopping from One Segment to Another.

Because the gradual scroll provided by the scroll bar is not present, it is necessary to use another way to provide a gentle transition when the focus segment is changed. Smooth, double-buffered animation transitions are used for this purpose.

An example of this animation is when hopping from the focus segment to one of the focus segment's descendants. A number of the segments visible on the display initially continue to be displayed after the descendant becomes the new focus segment, but they are located in different positions in the display. The animation shows each of these segments starting in their original position and gradually migrating to their new position.

Design Principle 8:. Maintain a Consistent Top of the Strategy-to-leaves Orientation.

Some approaches to strategy visualization can be found Lamping, J., Rao, R., and Pirolli, P. (1995). A focus+context technique based on hyperbolic geometry for viewing large hierarchies. In *Proceedings of the ACM SIGCHI Conference on Human Factors in Computing Systems*, Denver, ACM, the top of the strategy is placed dynamically anywhere in the display. The orientation from a node to its descendant nodes can vary its direction. Such approach, while useful from a purely quantitative display point-of-view, is not useful to the strategy consultant, who is used to viewing strategies that have, for example, the top of the strategy placed in a predictable, consistent location. As such, the herein disclosed approach is configured to adhere to this constraint, i.e. the focus segment is always at the center, left most portion of the display. The descendant segments of the focus segment always appear to the right of the focus segment.

Design Principle 9: Fit the Strategy Display into a Rectangular View.

Some approaches to strategy visualization (see, for example Lamping, et al. 1995) listed above require that the strategy be rendered in a circular or oval display. Computer screens are rectangular, and such an approach results in wasted screen real estate. As such, the preferred embodiment of the invention renders the display so that it makes most efficient use of a rectangular view.

Design Principle 10: Be Capable of Rendering All Strategies.

Some of the existing strategy display tools are designed to render only certain, limited, kinds of strategies. For example, there are commercially available tools that include a strategy viewer which renders strategies that use the same split variable in each split on a level. The technique herein makes no assumptions about the form of the strategies that it is rendering. Every strategy that a user or software provider creates can be viewed with the invention.

Illustrations

Figure 2:
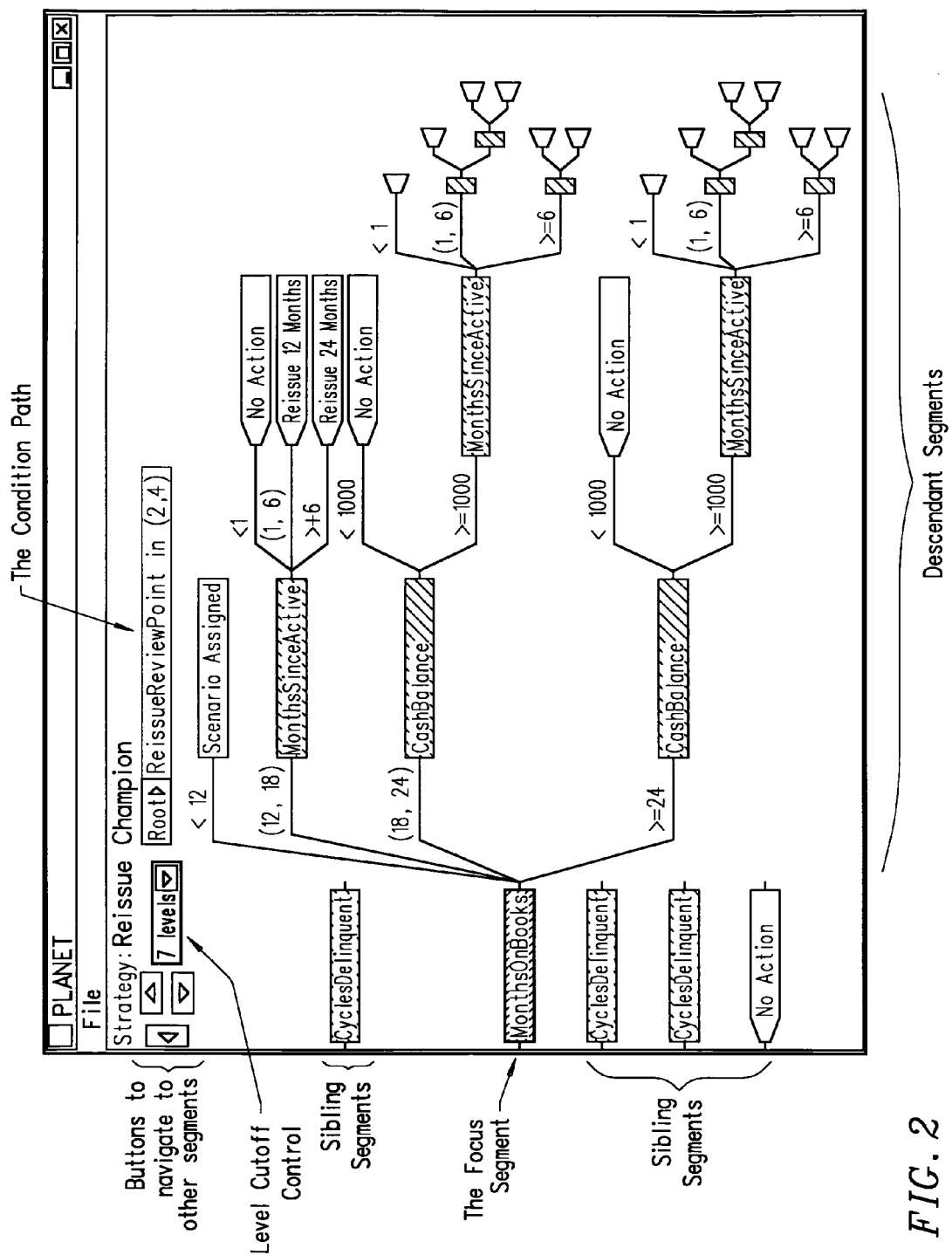
FIG. 2 is a display of a strategy view according to the invention.

FIGS. 1 and 2 compare the display of a portion of a strategy in a conventional strategy viewer (FIG. 1) with those provided in the herein disclosed invention (FIG. 2). The strategy is too large to be displayed in full with either strategy viewer. The figures are the same size and use the same font size for node labels so as to present as fair of a comparison as possible. The portion of the strategy shown in both displays begins with a split on "MonthsOnBooks."

Here are some differences:
  The only indication given by the conventional strategy viewer of the current location in the strategy is the position of the scroll bars, which indicate that we are somewhere in the middle of the strategy. The invention not only indicates that we are one level from the top of the strategy, it also indicates that the condition that leads us to our current position is "ReissueReviewPoint in [2,4]." This means that ReissueReviewPoint must be between 2 and 4 to get to this branch.
  In the conventional strategy viewer, one cannot see the "MonthsOnBooks" split in its entirety. The "MonthsOnBooks>=24" condition is scrolled below the window. With large strategys, this is quite a problem. Often one cannot see more than one condition of a split at any time. If one tries to zoom out enough to see all the conditions, the condition labels become too small to read. In the invention herein disclosed, this is never a problem. The left most conditions are always displayed in full as shown in this example.
  In the conventional strategy viewer, one cannot see the siblings of the "MonthsOnBooks" split. In the herein disclosed invention, the siblings are displayed above and below the "MonthsOnBooks" split. This makes for easier comparing, contrasting, and navigation between siblings.
  In the conventional strategy viewer, there is no clue as to what the branch looks like off the right edge of the window. One cannot tell how many levels deep it is or how many leaves it has. In the invention herein disclosed, a shrunken version of this portion of the branch is displayed to present this valuable contextual information.
  Suppose that one wants to navigate to the parent segment of the "MonthsOnBooks" split so one can edit this split. In the invention herein disclosed, one simply clicks the left arrow button to "hop" to it. If one wants to navigate to a sibling, one clicks the up arrow button or the down arrow button. Navigation is simple because one can hop from node to node. In the conventional strategy viewer, one must use the scroll bars to reposition one's view of the canvas. This means that one has to locate (or remember) where on the canvas the node for which one is looking is displayed. For large strategies, this is like finding a needle in a haystack.

IMPLEMENTATION

The presently preferred embodiment of the invention is implemented in Java. The choice of Java as a development language was motivated as follows:

Speed: It was important to implement the invention quickly. Industry studies indicate that with Java programmer productivity is enhanced by at least a factor of five over languages such as C++. This was borne out in the inventor's experience with the herein disclosed invention. The richness of the Java platform, such as automatic double-buffering for animations and automatic anti aliasing for smoother-looking graphics, made it possible to build the software in which the invention is implemented very rapidly. The invention, in its current state, was implemented by a single developer (a complete newcomer to Java) working half time for less than two months. The inventors are of the opinion that even a deeply experienced C++ developer could not deliver the same level of functionality in so robust a package in such a timeframe.

Small Footprint: It was important that the size of the implementation of the invention be small. The finished code is about 100 Kb. It is unlikely that similar functionality could be provided in such a small package using Portability: It was important that the invention herein disclosed be platform and browser neutral. Java is the natural choice.

Connectivity: It was important to provide easy connectivity to servers. Once again, the built-in Java networking classes made this development straightforward.

While Java is preferred for the presently preferred embodiment of the invention, it is possible to develop the invention with other programming languages, such as in C++. However, the resulting code would be larger, more difficult to implement, and (potentially) less robust. The preferred embodiment of the herein disclosed invention has a small memory footprint and garbage collection is unlikely to pose a problem. Even if it did, the problem could be solved in a straightforward way via a simple object-pooling scheme. The herein disclosed invention is probably a poor choice for delivery via a Windows Terminal Server mechanism. The animation that is used to provide the critical navigational cues may display poorly in such an environment. Rather, the invention herein disclosed is preferably run on the client machine. Fortunately, the small size of the preferred implementation of the invention makes this a trivial issue.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for the efficient display of large strategies, comprising the steps of:
    displaying in a strategy view an on screen part of a strategy that is not affected by an off screen part of said strategy;
    showing detail in said display where it is important;
    always showing a condition path on screen;
    providing said display without scroll bars;
    providing navigational shortcuts for traversing said strategy view;
    providing navigational cues in said display;
    fitting as much information on said display as possible;
    maintaining a consistent top of the strategy-children orientation in said display;
    allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
    fitting said display into a rectangular view; and
    rendering all strategies.

2. A computer implemented process implemented in a computer program that is stored in a tangible storage medium, said storage medium comprising:
    a computer program for performing any of the steps of:
        displaying in a strategy view an on screen part of a strategy that is not affected by an off screen part of said strategy;
        showing detail in said display where it is important;
        always showing a condition path on screen;
        providing said display without scroll bars;
        providing navigational shortcuts for traversing said strategy view;
        providing navigational cues in said display;
        fitting as much information on said display as possible;
        maintaining a consistent top of the strategy-children orientation in said display;
        allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
    fitting said display into a rectangular view; and
    rendering all strategies.

3. A method for the efficient display of large strategies, comprising the steps of:
    providing a strategy;
    providing a strategy view display of said strategy;
    always showing a condition path on screen;
    allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;

wherein if a portion of said strategy is not being viewed, it has no effect on layout of a visible portion of said strategy;

wherein said strategy layout is dynamic and adaptable to a current portion of said strategy being viewed; and wherein a user may view, in its entirety, a portion of said strategy on which said user currently wants to concentrate.

4. A method for the efficient display of large strategies, comprising the steps of:
providing a strategy;
providing a strategy view display of said strategy;
always showing a condition path on screen;
defining a single segment of said strategy as a focal point of said display;
displaying segments with less detail the farther away they are from said focal point; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position.

5. A method for the efficient display of large strategies, comprising the steps of:
providing a strategy;
providing a strategy view display of said strategy;
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position; and
always displaying a set of conditions needed to reach a single segment currently selected as a focal point.

6. A method for the efficient display of large strategies, comprising the steps of:
providing a strategy;
providing a strategy view display of said strategy;
always showing a condition path on screen;
instead of providing scroll bars, accomplishing navigation by hopping from segment to segment; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position.

7. A method for the efficient display of large strategies, comprising the steps of:
providing a strategy;
providing a strategy view display of said strategy;
always showing a condition path on screen; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
wherein selecting any segment makes that segment a focal point; and
wherein selecting any element in a decision path makes a corresponding segment the focal point.

8. A method for the efficient display of large strategies, comprising the steps of:
providing a strategy;
providing a strategy view display of said strategy;
always showing a condition path on screen;
providing navigational cues which may comprise smooth, double-buffered animation transitions; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position.

9. A method for the efficient display of large strategies, comprising the steps of:
providing a strategy;
providing a strategy view display of said strategy;
always showing a condition path on screen;
using available display space to provide extra context for a focus node;
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
eliminating redundant information; and
rendering information as compactly as possible.

10. The method of claim 9, wherein widths of nodes and levels are only wide enough to fit a widest label.

11. A method for the efficient display of large strategies, comprising the steps of:
providing a strategy;
providing a strategy view display of said strategy;

always showing a condition path on screen;
maintaining a consistent top of the strategy-children orientation; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
wherein a top of the strategy is always at a center, left most portion of said display.

12. A method for the efficient display of large strategies, comprising the steps of:
providing a strategy;
providing a strategy view display of said strategy;
always showing a condition path on screen;
fitting said display into a rectangular view; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
wherein said strategy layout is dynamic and adaptable to a current portion of said strategy being viewed.

13. A method for the efficient display of large strategies, comprising the steps of:
providing a strategy; and
always showing a condition path on screen;
providing a strategy view display of said strategy; and
allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position;
wherein no assumption is made about a form of said strategies that are being rendered; and
wherein every strategy that a user or software provider creates can be displayed.

14. A method for the efficient display of large strategies, comprising the steps of:
providing a strategy;
providing a strategy view display of said strategy;
always showing a condition path on screen; and
selecting a portion of said strategy to display by choosing a branch of said strategy view to display and optionally how many levels of said branch to display by allowing a branch of a first focus segment to be chosen for display by selecting a segment at top of said branch so that said segment becomes a new focus segment, wherein if said new focus segment is a descendant of said first focus segment, then, after the descendant segment becomes said new focus segment, continuing to display a number of segments initially visible on said display but initially located in a different position in said display, and providing an animation showing each of said segments starting in their original position and migrating to a new position.

15. A method of claim 14, wherein a branch segment is either displayed in its entirety or completely hidden.

* * * * *